US007835307B2

(12) United States Patent
Baggott et al.

(10) Patent No.: US 7,835,307 B2
(45) Date of Patent: Nov. 16, 2010

(54) NETWORK DISCOVERY TOOL

(75) Inventors: Jonathan Baggott, London (GB); Andrew Hepburn, Brookwood (GB)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 12/403,990

(22) Filed: Mar. 13, 2009

(65) Prior Publication Data

US 2009/0232025 A1 Sep. 17, 2009

(30) Foreign Application Priority Data

Mar. 14, 2008 (EP) .................................. 08152769

(51) Int. Cl.
*H04L 12/28* (2006.01)
*G06F 15/177* (2006.01)
(52) U.S. Cl. ........................ 370/255; 709/221; 709/222
(58) Field of Classification Search ......... 370/254–258; 709/221–222
See application file for complete search history.

(56) References Cited

U.S. PATENT DOCUMENTS 7,069,343 B2   6/2006 Goringe et al.

OTHER PUBLICATIONS

Culpin, "Discovery of Internet Topology Through Active Probing," Catholic University of Louvain, Faculty of Applied Sciences, Computer Science Department, Aug. 2006.
Gunes, et al., "Analytical IP Alias Resolution," University of Texas at Dallas, Department of Computer Science.

*Primary Examiner*—Ronald Abelson
(74) *Attorney, Agent, or Firm*—Nelson and Nelson; Alexis V. Nelson; Daniel P. Nelson

(57) ABSTRACT

A method for discovering network devices having special IP addresses may include collecting a plurality of IP addresses, where each IP address corresponds to a network device. One or more IP addresses may be identified as a predetermined IP address and/or a predetermined address type. Each of the IP addresses may then be classified according to various IP address types. A network address topology may be built based on the IP addresses, the network devices, and the IP address types. Finally, a special network topology may be built that includes network devices having IP addresses identified as the predetermined IP address and/or the predetermined IP address type.

20 Claims, 3 Drawing Sheets

NETWORK DISCOVERY TOOL

BACKGROUND

A network discovery system is a type of network management system that investigates a data network and discovers a topology of network devices that make up that network. IBM® Tivoli® Network Manager IP is a type of network discovery system for ISO layers 2 and 3 (the "IP layers"). IBM® Tivoli® Network Manager TN is another type of network discovery system for ISO layer 1 (the "transport layer" or "physical layer").

In a network of network devices, some devices have multiple IP addresses. One of the IP addresses may be the primary IP address used to identify and control the device, while the other IP addresses may be used for secondary purposes. These secondary IP addresses are referred to herein as "special IP addresses." Special IP addresses may be system-defined, and can be any type of IP address, including some operational IP addresses.

One type of special IP address is a virtual IP address (sometimes called an "imaginary IP address" or "secret IP address"). A virtual IP address may be used in the operation of a device, but does not normally show up in the device's IP address table when such a request is made.

Another type of special IP address is an out-of-band IP address that has restricted access, normally limited to the systems within the network operations center ("NOC"), such as the network management software. An out-of-band IP address is generally inaccessible to customers on the network. Other types of special IP addresses may be defined by the user as management IP addresses according to other properties.

SUMMARY

Embodiments of the invention have been developed to discover network devices having special IP addresses such as virtual IP addresses, management IP addresses and out-of-band IP addresses.

A method for discovering network devices having special IP addresses in accordance with embodiments of the present invention may include collecting a plurality of IP addresses, where each IP address corresponds to a network device. One or more IP addresses may be identified as a predetermined IP address and/or a predetermined address type. Each of the IP addresses may then be classified according to various IP address types. A network address topology may be built based on the IP addresses, the network devices, and the IP address types. Finally, a special network topology may be built that includes network devices having IP addresses identified as the predetermined IP address and/or the predetermined IP address type.

A corresponding system and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

Figure 1:
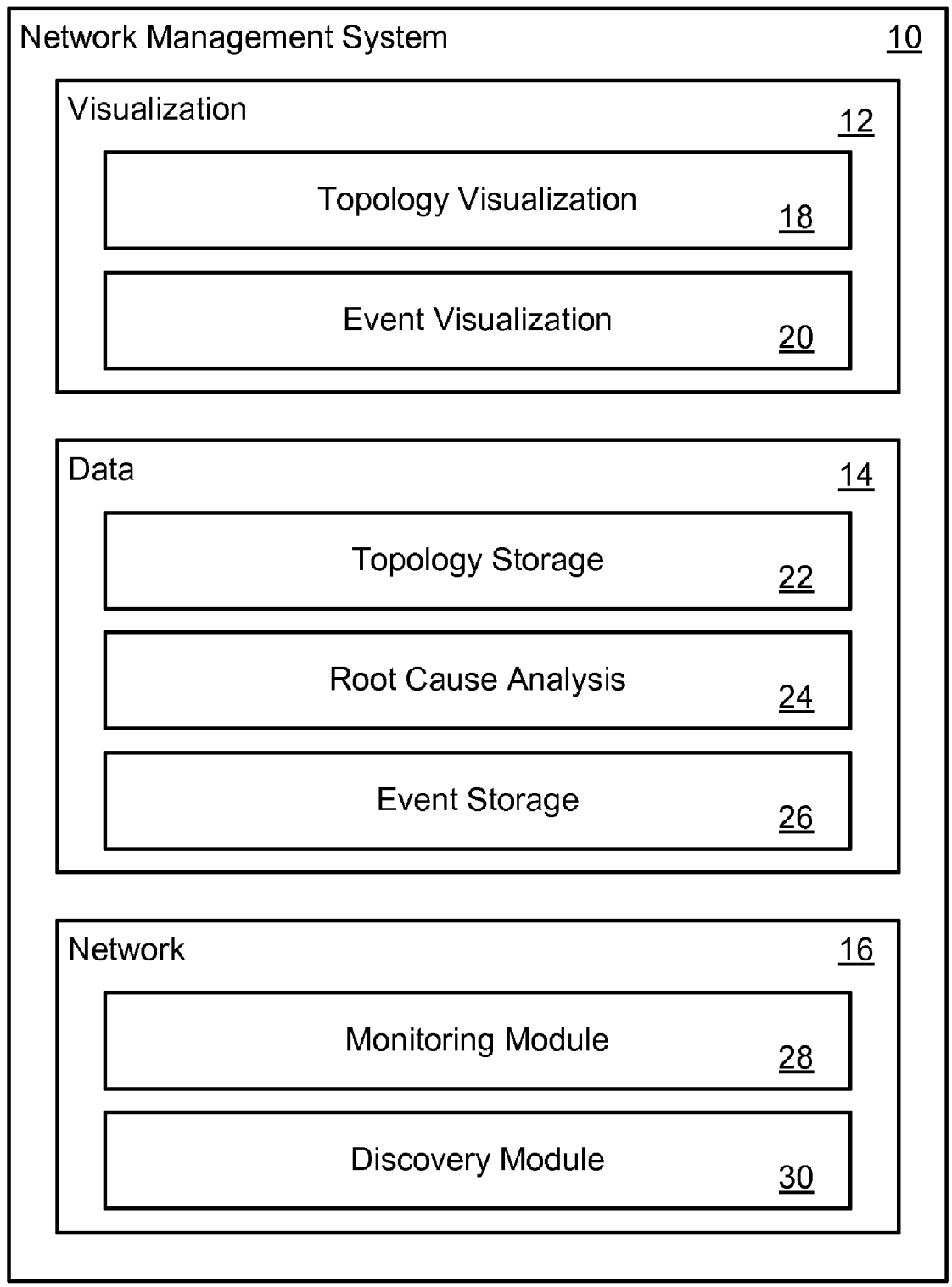
FIG. 1 is a block diagram of a network discovery system in accordance with certain embodiments of the invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a network management system 10 in accordance with embodiments of the invention may be based on IBM® Tivoli® Netcool Manager IP Edition. FIG. 1 provides a conceptual view of a network management system 10, including a visualization layer 12, a data layer 14, and a network layer 16.

The visualization layer 12 may include topology visualization 18 and event visualization 20. Using topology visualization 18, network operators may use a number of topology visualization GUIs to view the network and to drill into network devices. Topology maps may be fully customized to show specific devices, or to show specific device groupings such as subnets and virtual LANs ("VLANs"). Operators may switch from topology views to alert views in order to see alert details for affected devices. They may also have access to diagnostic tools such as topology browsers, which may obtain IP data for any device.

Using event visualization 20, operators may view alert lists and use alert severity ratings to quickly identify high priority device alerts. They may switch from alert views to topology views to see which devices are affected by specific alerts. They may also identify root-cause alerts and list the symptom alerts that may contribute to the root cause. Alerts may be generated by a network manager monitoring mechanism such as a Network Manager IP Edition monitoring mechanism, or may be received from other network management systems or mechanisms.

The data layer 14 may include topology storage 22, root-cause analysis 24, and event storage 26. Topology storage 22 may include a topology database, also known as a Network Connectivity and Inventory Model ("NCIM"). This may include a relational database to consolidate topology data from, for example, Network Manager IP Edition (layers 2 and 3) and from the IBM Tivoli Network Manager Transmission Edition product (layer 1). Other analogous software products may also be accessed and used in accordance with embodiments of the invention.

Root-cause analysis 24 may determine the root cause of one or more device alerts. A failure situation on the network may generate multiple alerts. This is because a failure condition on one device may render other devices inaccessible. Alerts may be generated to indicate that all of these devices are inaccessible. In one embodiment, the network management system 10, such as Network Manager IP Edition, may perform root cause analysis by correlating event information with topology information, and thereby determine which devices are temporarily inaccessible due to other network failures. Alerts on devices which are temporarily inaccessible may be suppressed, that is, shown as symptoms of the original root-cause alert. Root-cause alerts may be shown in alert lists and topology maps with the highest severity so that operators can easily identify them. Event and alert data may be stored, for example, in a Netcool/OMNIbus ObjectServer or other event storage 26 device.

A network layer 16 may include a monitoring module 28 and a discovery module 30. The monitoring module 28 may enable network administrators to configure polling of discovered network devices. Such polls may indicate whether a network device is up or down, whether it has exceeded key performance parameters, and/or whether links between devices may be faulty. If a poll fails, the network management system 10 may generate a device alert, which operators may view in alert lists.

Figure 2:
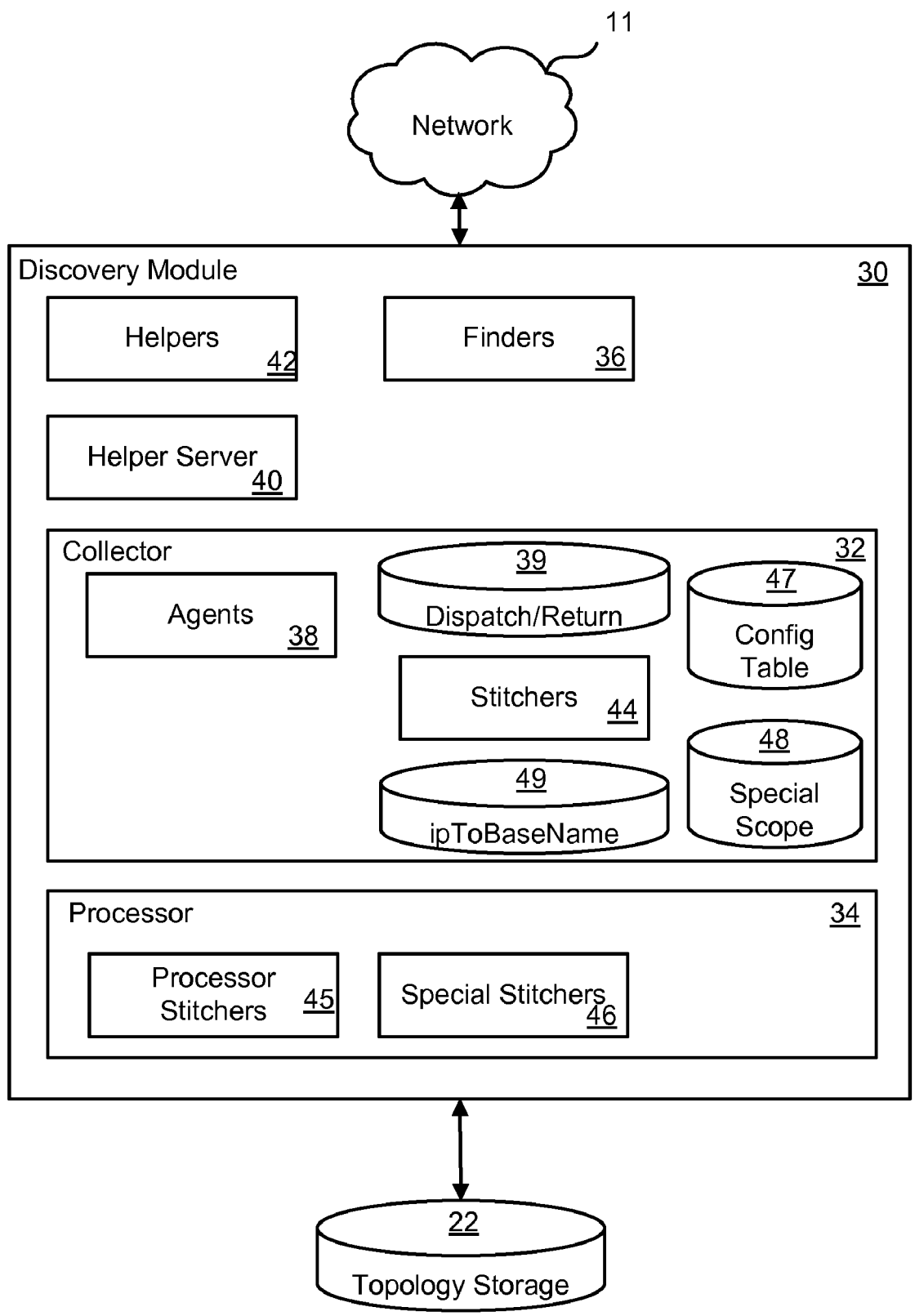
FIG. 2 is a schematic diagram detailing a discovery module in accordance with one embodiment of the invention.

As shown in FIG. 2, the discovery module 30 may include a collector 32, a processor 34, finders 36, a helper server 40, and helpers 42. The discovery module 30 may enable network administrators to generate a network topology. This topology may be stored in the topology database 22, and may be visualized by network operators as topology maps. Such topology maps may be customized to show specific devices or specific device groupings, such as subnets and VLANs.

In some embodiments, the discovery module 30 may perform two main functions. First, the discovery module 30 may collect raw IP data to detect existence of a device on the network, and may query the device for further inventory and connectivity information. Second, the discovery module 30 may process the raw IP data, inventory and connectivity information to generate a topology model.

As shown in FIG. 2, the collector 32 may include agents 38, a returns/dispatch table 39, stitchers 44, a discovery configuration table 47, a special scope table 48, and an ipToBaseName table 49.

Finders 36 may discover the existence of devices on the network 11 and place the IP data in a dispatch/return table 39. Such finders 36, however, may not retrieve connectivity information.

Agents 38 may be used to request information, such as connectivity information, from devices that the finders 36 have discovered. Each agent 38 may be specialized to retrieve information from different devices, and in certain cases, to use different protocols. Agents 38 may not have any direct interaction with the network, but may instead retrieve information through the helper server 40. In some embodiments, agents 38 may include libraries or text files, and may be specialized for particular protocols, devices or classes. In one embodiment, for example, an agent 38 may be used to retrieve the name of a network device. In another embodiment, an agent 38 may be used to acquire any associated IP address.

The returns/dispatch table 39 may provide intermediate processing storage for the finders 36 and agents 38.

The helper server 40 may manage the helpers 42, and may store information retrieved from the network. Agents 38 may retrieve information through the helper server 40 to reduce the load on the network. In certain embodiments, the helper server 40 may service requests directly with cached data, or may pass on the request to the appropriate helper 42.

Helpers 42 may retrieve information from the network on behalf of the discovery agents 38. Helpers 42 may also translate agent 38 queries into an appropriate network protocol and make requests to the devices.

A simple three state value may be assigned to a variable, such as m_AllowVirtual, for each network device in the discovery configuration table 47. This value may be used to define how special IP addresses are handled. For example, in one embodiment, the variable m_AllowVirtual or other analogous variable may be set to one of three states. The first state, or state (0), may indicate that special IP addresses are not allowed. The second state, or state (1), may indicate that special IP addresses are allowed. The third state, or state (2), may indicate that special IP addresses are allowed if they are further defined in a special scope table 48.

In one embodiment, state (0) may be equivalent to known products that do not process virtual IP addresses. State (1) may be a default state such that, in the new functionality, virtual IP addresses are allowed and not duplicated, based on the IP tables 47. State (2) may be defined to allow the customer to easily specify special cases by entering an IP address or range of IP addresses.

A special scope table 48 in accordance with embodiments of the invention may store definitions for how special IP addresses are handled and tagged. In one embodiment, the scope special table 48 may include the following variables: m_Zones, m_IsManagement, m_OutOfBand, and m_IsValidVirtual. The variable m_Zones may list zones that are not null, and may define the regions of the network for which this special scope is applicable. The variable m_AddressSpace may be a text field for an optional address space identifier for a particular scope entry. The variable m_OutOfBand may be a Boolean-integer type indicating the management area out-of-band or in-band (e.g., "0" for in-band and "1" for out-of-band). The variable m_IsManagement may be a Boolean-integer type indicating a Management IP address. Finally, the variable m_IsValidVirtual may be a Boolean-integer type indicating a valid virtual IP address.

Stitchers 44 may transfer, manipulate and distribute data between databases. Stitchers 44, such as processor stitchers 45, may also process the information collected by agents 38, and use this information to create the network topology in the processor. In such an embodiment, special stitchers 44 may be included in the collector 32 and the processor 34. Collector special stitchers 44 may include, for example, IpToBaseName stitcher, CheckIfMgmtAddress stitcher, CheckValidVirtual stitcher, and CheckOutOfBand stitcher.

The IpToBaseName stitcher 44 may check the IP address and IP address type against the predetermined definitions in the configuration table 47. If the IP address or IP address type is within the scope of the configuration table, then IPToBaseName may take the IP address from the returns/dispatch table 39 and populate the ipToBaseName table 49. This stitcher 44 may start when an IP address is inserted in the returns/dispatch table 39.

The CheckIfMgmtAddress stitcher 44 may determine if the IP address is a defined management address in the scope special table. If so, then the ipToBaseName table 49 may be modified to denote the management status of the IP address.

The CheckValidVirtual stitcher 44 may determine if the IP address from the address stage is a valid virtual IP address by attempting to discover details of the IP device. The value "0" may be returned if the IP address is determined not to be a valid virtual IP address. The value "1" may be returned if the IP address is determined to be a valid virtual IP address. If so, then IpToBaseName table 49 may be modified to denote the valid virtual status of the IP address.

The CheckOutOfBand stitcher 44 may check for devices that have been defined in the special scope table 48 as out-of-band. If found, then IpToBaseName table 49 may be modified to denote the out-of-band status of the IP address.

In some embodiments, the processor 34 may include processor stitchers 45 and special processor stitchers 46. After all the discovery agents 38 have finished and the discovery module 30 enters the data processing stage, processing stitchers 45 may produce the topology model from ipToBaseName 49 and store it in a topology database 22. The special processor stitchers 46 may make changes to the topology model depending on the classification of the special IP addresses, as defined in the special scope table 48.

Special processor stitchers 46 may include NamingViaManagementInter stitcher and RemoveOutOfBandConnectivity stitcher. The NamingViaManagementInter stitcher may look for management IP addresses from ipToBaseName table 49 and confirm that the device name is consistent with the management server. This may ensure that entities are named according to the name and IP address of the management interface.

On devices having many IP addresses, each IP interface may have one or more names. This may lead to confusion over what name should be used to refer to a network entity. Generally, operators of the software may associate a particular entity with one particular name. This name may be that of the management interface. The NamingViaManagementInter stitcher 46 may utilize the previous configuration to ensure the entity is named by its management address to ensure consistency.

In some embodiments, the RemoveOutOfBandConnectivity stitcher 46 may remove connectivity for out-of-band devices from the topology. This connectivity may be made visible to the user, but may not be present for root cause analysis ("RCA").

Indeed, including the out-of-band network connectivity in the data model with the in-band network connectivity may cause confusion when trying to perform RCA. To perform RCA, the expected path that the data will take through the network should be determined to facilitate identifying the cause of a loss of data. The in-band and out-of-band networks may be completely separate such that data does not travel between them. If the sections of in-band and out-of-band networks are not specified, the path the data will take may not be able to be determined. Conversely, specifying which interfaces are out-of-band may enable them to be compensated for when performing RCA.

In some embodiments, a discovery module 30 may include one or more discovery cycles. In the first discovery cycle, the network management software 10 may discover the existence of a predetermined majority of devices on the network, and may proceed to complete all data collection and processing operations associated with these devices. If the network being discovered is particularly large or complex, more than two discovery cycles may be required to complete a full discovery.

Figure 3:
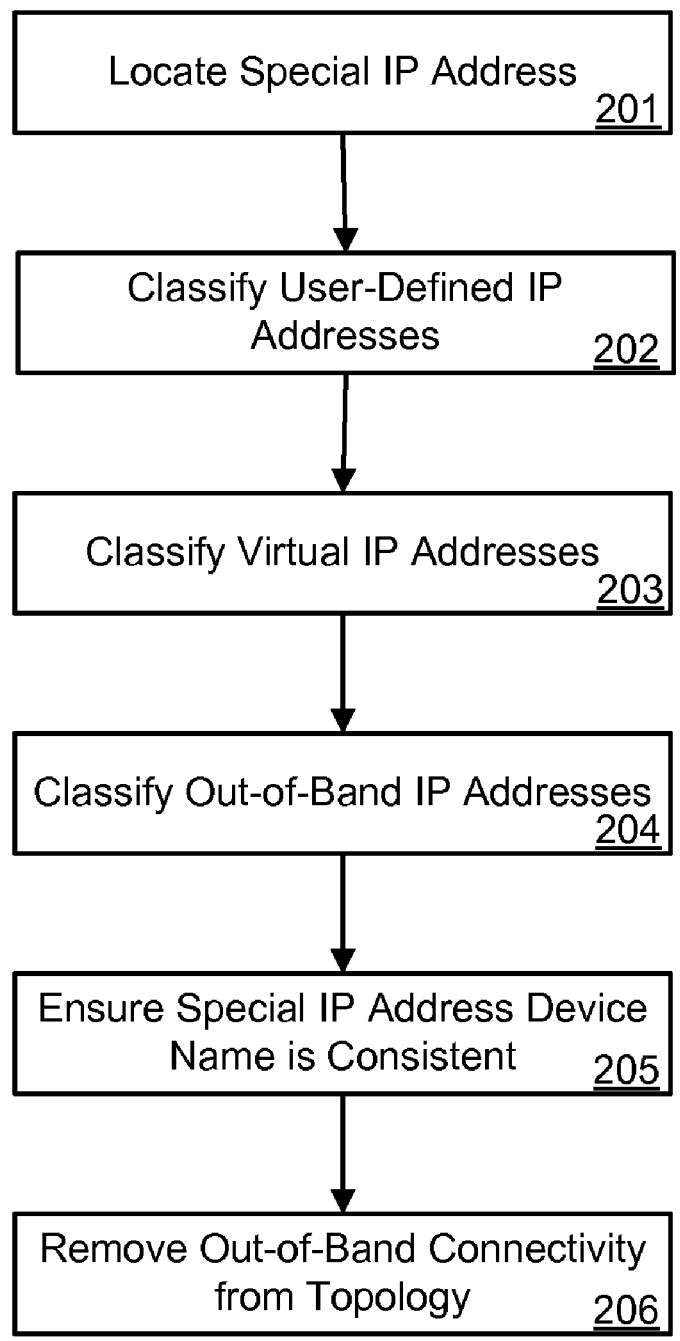
FIG. 3 is a flow chart of a method in accordance with certain embodiments of the invention.

Referring now to FIG. 3, a method for discovery may be divided into the following steps: collecting 201 IP addresses and associated IP address tables; determining 202 whether the IP address is a user-defined IP address; determining 203 whether the IP address is a virtual IP address; determining 204 whether the IP address is an out-of-band IP address; ensuring 205 that the special IP address device name is consistent; and removing 206 out-of-band connectivity from the topology for root-cause analysis.

In certain embodiments, collecting 201 IP addresses and associated IP address tables may be initially achieved by the IpToBaseName stitcher 44. Selected IP addresses may then be moved to the ipTpBaseName table 49.

In some embodiments, CheckIfMgmtAddress stitcher 44 may determine 202 if the selected IP address is a defined management address in the special scope table 48. If it is, then the ipToBaseName table 49 may be modified to classify the IP address as a management IP address.

Determining 203 whether the IP address is a virtual IP address may be achieved by the CheckValidVirtual stitcher 44. In one embodiment, each IP address may be associated with an AllowVirtual flag. If the AllowVirtual flag is 0, then the IP address may not be processed if it is a virtual IP address. If the AllowVirtual Flag is 1, then the IP address may be processed. If the AllowVirtual flag is 2, then the entries in the special scope table may be checked to verify whether any of them cover the input IP address. If not, then the default value may be 0, such that the IP addressed may not be processed. If a scope special entry does cover the target IP address, then the IsValidVirtual value of that entry may be used to define whether the IP address may be processed.

In some embodiments, determining 204 whether the IP address is an out-of-band IP address may be achieved by the CheckOutOfBand stitcher 44. Each entry in the special scope table 48 may be parsed and information added to indicate whether the IP address is a management address or out-of-band address. The information may also be added to the entity record for the defined IP address.

Ensuring 205 that the special IP address device name is consistent may be performed by the NamingViaManagementInter stitcher 46. This stitcher 46 may look for management IP addresses from ipToBaseName table 49 and attempt to ensure the base address and name is that of the management server.

Removing 206 out-of-band connectivity from the topology for root-cause analysis may be performed by the RemoveOutOfBandConnectivity stitcher 46. This stitcher 46 may remove connectivity for out-of-band devices from the topology for root cause analysis ("RCA").

An example of the scope special table 48 is provided below. As shown, any address in the IP subnet 1.2.0.0/16 may be considered a management address and out-of-band. Addresses within that range which are virtual, however, (i.e., not present in the IP table) may not be processed. The user may be allowed to specify whether all virtual IP addresses are allowed or disallowed, or allowed only if within specified ranges. The user may also be able to define exactly how those IP addresses should be managed within specific ranges.

```
Scope.special table example
insert into scope.special
(
    m_Zones,
    m_IsManagement,
    m_OutOfBand,
    m_IsValidVirtual
)values
(
    [
        {
        m_Subnet="1.2.0.0",
        m_NetMask=16
        }
    ],
    1,
    1,
    0
```

While it is understood that the process software may be deployed by manually loading directly in the client, server and proxy computers via loading a storage medium such as a CD, DVD, etc., the process software may also be automatically or semi-automatically deployed into a computer system by sending the process software to a central server or to a group of central servers. The process software may then be downloaded into the client computers that may execute the process software.

In one embodiment, the process software may be sent directly to the client system via e-mail. The process software may then be detached to a directory or loaded into a directory by a button on the e-mail that executes a program to detach the process software into a directory.

In another embodiment, the process software may be sent directly to a directory on the client computer hard drive. Where there are proxy servers, the process software may select the proxy server code, determine on which computers to place the proxy server code, transmit the proxy server code, and install the proxy server code on the proxy computer. The process software may be transmitted to and stored on the proxy server.

The process software may be integrated into a client, server and network environment by providing for the process software to coexist with applications, operating systems and network operating systems software. The process software may then be installed on the clients and servers in the environment where the process software will function.

In one embodiment, a first step may be to identify any software on the clients and servers, including the network operating system where the process software may be deployed, that may be required by the process software, or that may work in conjunction with the process software. This may include a network operating system used to enhance a basic operating system by adding networking features. Next, the software applications and version numbers may be identified and compared to the list of software applications and version numbers that have been tested to work with the process software.

Software applications that are missing or that do not match the correct version may be upgraded with the correct version numbers. Program instructions that pass parameters from the process software to the software applications may be checked to ensure the parameter lists match the parameter lists required by the process software. Conversely, parameters passed by the software applications to the process software may be checked to ensure the parameters match the parameters required by the process software. The client and server operating systems, including the network operating systems, may be identified and compared to the list of operating systems, version numbers and network software that have been tested to work with the process software. Those operating systems, version numbers and network software that do not match the list of tested operating systems and version numbers may be upgraded on the clients and servers to the required level. After ensuring that the software where the process software is to be deployed, is at the correct version level that has been tested to work with the process software, the integration may be completed by installing the process software on the clients and servers.

The process software may be shared, simultaneously serving multiple customers in a flexible, automated fashion. It may be standardized, requiring little customization and may further be scalable, providing capacity-on-demand in a pay-as-you-go model.

The process software may be stored on a shared file system accessible from one or more servers. The process software may be executed via transactions that contain data and server processing requests that use CPU units on the accessed server. CPU units may be units of time such as minutes, seconds, or hours on the central processor of the server.

Additionally, the accessed server may make requests of other servers that require CPU units. CPU units are an example that represents but one measurement of use. Other measurements of use include, but are not limited to, network bandwidth, memory usage, storage usage, packet transfers, complete transactions, and the like.

When multiple customers use the same process software application, their transactions may be differentiated by the parameters included in the transactions that identify the unique customer and the type of service for that customer. All of the CPU units and other measurements of use that are used for the services for each customer may be recorded. When the number of transactions to any one server reaches a number that begins to affect the performance of that server, other servers may be accessed to increase the capacity and to share the workload. Likewise, when other measurements of use, such as network bandwidth, memory usage, storage usage, and the like, approach a capacity so as to affect performance, additional network bandwidth, memory usage, storage, and the like may be added to share the workload.

The measurements of use used for each service and customer may be sent to a collecting server that sums the measurements of use for each customer for each service that was processed. The service may be processed anywhere in the network of servers that provide the shared execution of the process software. The summed measurements of use units may be periodically multiplied by unit costs, and the resulting total process software application service costs may be sent to the customer and/or indicated on a web site accessed by the customer. In some embodiments, the customer may remit payment to the service provider via the web site. In another embodiment, the service provider may request payment directly from a customer account at a banking or financial institution. In another embodiment, if the service provider is also a customer of the customer that uses the process software application, the payment owed to the service provider may be reconciled to the payment owed by the service provider, thus minimizing transfer of payments.

In certain embodiments, the process software may be deployed, accessed and executed through the use of a virtual private network ("VPN"), which may include any combination of technologies that can be used to secure a connection through an otherwise unsecured or untrusted network. The use of VPNs may improve security and reduce operational costs. The VPN may make use of a public network, usually the Internet, to connect remote sites or users together. Instead of using a dedicated, real-world connection such as leased line, the VPN may create "virtual" connections routed through the Internet from the company's private network to the remote site or employee. Access to the software via a VPN may be provided as a service by specifically constructing the VPN for purposes of delivery or execution of the process software (i.e., the software resides elsewhere). The lifetime of the VPN may be limited to a given period of time or a given number of deployments based on an amount paid.

In some embodiments, the process software may be deployed, accessed and executed through a remote-access or a site-to-site VPN. When using a remote-access VPN, the process software may be deployed, accessed and executed via secure, encrypted connections between a company's private network and remote users. The secure connections may be provided by a third-party service provider.

An enterprise service provider ("ESP") may set up a network access server ("NAS") and provide the remote users with desktop client software for their computers. Telecommuters may then dial a toll-free number, or attach directly via a cable or DSL modem, to reach the NAS. The telecommuters may then use their VPN client software to access the corporate network and to access, download and execute the process software.

When using the site-to-site VPN, the process software may be deployed, accessed and executed through the use of dedicated equipment and large-scale encryption used to connect a company's multiple fixed sites over a public network, such as the Internet. The process software may be transported over the VPN via tunneling, such that an entire packet may be placed within another packet and sent over a network. The protocol of the outer packet may be understood by the network and both points, called tunnel interfaces, where the packet may enter and exit the network.

The invention claimed is:

1. A method for discovering network devices having special IP addresses, the method comprising:
   collecting a plurality of IP addresses from a plurality of network devices, each of the plurality of IP addresses corresponding to a network device;
   identifying at least one of the plurality of IP addresses as at least one of a special IP address and a special IP address type;
   classifying each of the plurality of IP addresses according to various IP address types;
   building a network address topology based on the plurality of IP addresses, the network devices, and the IP address types;
   building a special network address topology comprising at least one network device having an IP address identified as at least one of the special IP address and the special IP address type; and
   storing the network address topology and special network topology in a database.

2. The method of claim 1, wherein the special IP address type is a virtual IP address that does not respond to a request for discovery.

3. The method of claim 1, wherein the special IP address type is an out-of-band IP address type where access to the device is restricted.

4. The method of claim 1, wherein the special IP address type is a user-defined management IP address.

5. The method of claim 1, further comprising defining, via a user interface, at least one special IP address type.

6. The method of claim 1, wherein building the special network address topology comprises identifying characteristics of the IP address identified as at least one of the special IP address and the special IP address type.

7. The method of claim 1, wherein building the special network address topology comprises verifying that the IP address identified as at least one of the special IP address and the special IP address type matches an operational IP address for a network device.

8. The method of claim 1, wherein building the special network address topology comprises removing connectivity for a network device having an IP address classified as an out-of-band IP address.

9. A system for discovering network devices having special IP addresses, the system comprising:
 an IP address collecting engine for collecting a plurality of IP addresses and identifying at least one of the plurality of IP addresses as at least one of a special IP address and a special IP address type, wherein each of the plurality of IP addresses corresponds to a network device; and
 an IP address processing engine for classifying each of the IP addresses according to various IP address types, building a network address topology based on the plurality of IP addresses, the network devices, and the IP address types, and building a special network address topology comprising network devices having an IP address identified as at least one of the special IP address and the special IP address type.

10. The system of claim 9, wherein the special IP address type comprises a virtual IP address that does not respond to a request for discovery.

11. The system of claim 9, wherein the special IP address type comprises an out-of-band IP address having restricted access to certain network devices.

12. The system of claim 9, wherein the special IP address comprises a user-defined management IP address.

13. The system of claim 9, further comprising a user interface for defining at least one special IP address type.

14. The system of claim 9, wherein the IP address processing engine further verifies that the IP address identified as at least one of the special IP address and the special IP address type matches an operational IP address for a network device.

15. The system of claim 9, wherein the IP address processing engine further removes connectivity for a network device having an IP address classified as an out-of-band IP address.

16. A computer program product for discovering a network system, the computer program product comprising a non-transitory computer-readable storage medium having computer-usable program code embodied therein, the computer-usable program code comprising:
 computer-usable program code for collecting a plurality of IP addresses from a plurality of network devices, each of the plurality of IP addresses corresponding to a network device;
 computer-usable program code for identifying at least one of the plurality of IP addresses as at least one of a special IP address and a special IP address type;
 computer-usable program code for classifying each of the plurality of IP addresses according to various IP address types;
 computer-usable program code for building a network address topology based on the plurality of IP addresses, the network devices, and the IP address types; and
 computer-usable program code for building a special network address topology comprising network devices having an IP address identified as at least one of the special IP address and the special IP address type.

17. The computer program product of claim 16, further comprising computer-usable program code for defining, via a user interface, at least one special IP address type.

18. The computer program product of claim 16, wherein the computer-usable program code for building the special network address topology comprises computer-usable program code for identifying characteristics of the IP address identified as at least one of the special IP address and the special IP address type.

19. The computer program product of claim 16, wherein the computer-usable program code for building the special network address topology comprises computer-usable program code for verifying that the IP address identified as at least one of the special IP address and the special IP address type matches an operational IP address for a network device.

20. The computer program product of claim 16, wherein the computer-usable program code for building the special network address topology comprises computer-usable program code for removing connectivity for a network device having an IP address classified as an out-of-band IP address.

* * * * *